Nov. 21, 1967  W. S. BOYLE ETAL  3,354,404
END PUMPED OPTICAL MASER
Filed Aug. 29, 1961
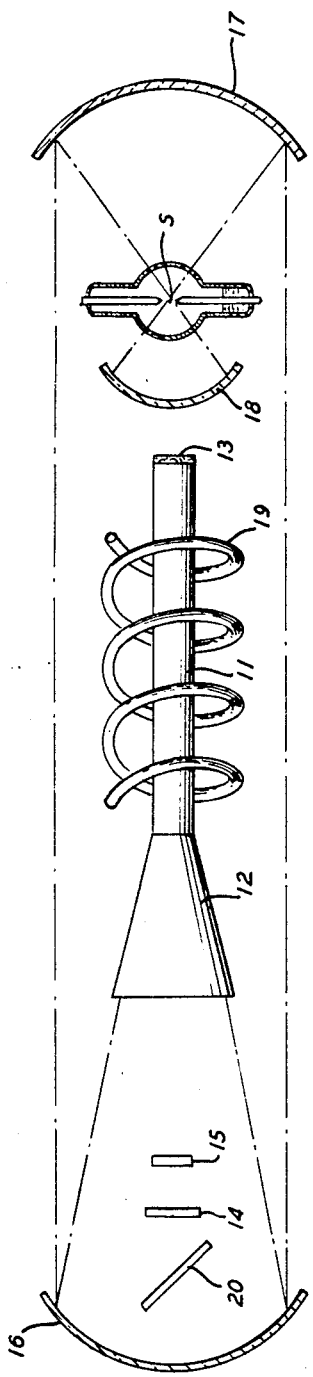
INVENTORS: W. S. BOYLE
D. F. NELSON
BY
A. J. Torsiglieri
ATTORNEY

3,354,404
END PUMPED OPTICAL MASER
Willard S. Boyle, Berkeley Heights, and Donald F. Nelson, Summit, N.J., assignors to Bell Telephone Laboratories, Incorporated, New York, N.Y., a corporation of New York
Filed Aug. 29, 1961, Ser. No. 134,776
5 Claims. (Cl. 331—94.5)

This relates to optical maser arrangements.

As known to workers in the art, an optical maser is a device which serves as a source of coherent electromagnetic wave energy of optical wavelength as a result of stimulated emission.

Various kinds of optical masers are now known including both solid state and gaseous types. Typically, a solid state master comprises a crystalline rod, for example of ruby, silvered at its two ends for forming an optical cavity of the rod, and a source of pumping energy for irradiating the rod and creating therein an inverted population distribution. The principles of the invention have primary application to the solid state form although some aspects are applicable also to the gas form.

Various problems have been encountered with solid state optical masers. First, typically the amount of pumping energy needed has been so large that continuous wave operation is difficult to realize.

One object of the invention is to improve the pumping efficiency to facilitate continuous wave operation when such operation is desired.

Another difficulty has been the long start-up time, i.e., the interval between the initial application of pumping wave irradiation and the onset of maser oscillation. This is particularly bothersome if it is desired to pulse the pumping energy to pulse modulate the maser oscillation.

Accordingly, another object is to reduce the length of this interval, thereby to facilitate pulse modulation of the oscillations when such modulation is desired.

The modulation of the maser output poses other problems to which the invention is also addressed.

A feature of the invention is a novel pumping arrangement that improves pumping efficiency, permits operation with a shorter start-up time, and in other respects facilitates modulation of the maser oscillations.

More particularly, a feature of the invention is an arrangement for introducing the pumping radiation into the rod by way of one of its ends whereby such radiation traverses the length of the rod. Advantageously, the radiation is introduced into the rod by way of a light collecting element which typically takes the form of the frustum of a cone, the smaller base of which is positioned contiguous to one end of the rod and the larger base of which is exposed to the pumping radiation. Moreover, advantageously, the free end of the rod is silvered to form one reflecting boundary of the optical cavity characteristic of an optical maser and the other reflecting boundary is provided either as a separate element spaced from the larger base of the cone or as a coating on such base.

Moreover, in accordance with a particular aspect of the invention for use with pulsed operation, end pumping in the manner described is employed to keep the rod primed to a point just below the onset of oscillations and an auxiliary pumping source disposed to irradiate the sides of the rod is used to initiate the oscillations when desired. By this technique, a considerable reduction in start-up time can be realized.

The invention will be better understood from the following more detailed description taken in conjunction with the accompanying drawing which shows schematically the basic arrangement of the invention.

With reference now to the drawing, in the maser shown the cylindrical rod 11 serves as the active medium which provides the stimulated emission to be termed the maser oscillation or light. Flush with one end of the rod is positioned a collecting element 12 shaped as a frustum of a cone, its smaller base being contiguous to one end of the cylindrical rod and having an area equal to that of such end of the rod and its larger base being exposed to the pumping light. The dimensions of the cone are chosen in consideration of the solid angle of the pumping light and the index of refraction of the cone and the surrounding space so that substantially all pumping light entering the larger base of the cone will pass through the smaller base of the cone, total internal reflections serving to prevent the escape of light from the sides of the cone. The exposed end of the rod is silvered to provide a reflective coating 13 which forms one boundary of an optical cavity for the maser light. The opposite boundary is provided by reflecting element 14 appropriately positioned to form with the coating 13 the desired optical cavity. As shown, the reflecting element 14 is spaced from the larger base of the collecting element to permit the interposition of a modulating element shown schematically by block 15. A source of pumping light S is positioned beyond the silvered end of the rod. A pair of reflectors 16 and 17 positioned at opposite ends of the arrangement, together with mirror 18 positioned intermediate between the silvered ends of the rod and the source S are designed to concentrate the light emitted from source S to the exposed larger base of the collecting element 12. The reflectors 13, 16, 17 and 18 aided by the internal reflections characteristic of the rod 11 and collecting element 12 serve as an optical cavity for the pumping light provided by the source. The losses of such pumping cavity should be small compared to the absorption in the active rod of the pumping light.

Additionally, an auxilary pumping light source 19 in helical form encloses the rod 11 for use as described. A cylindrical reflector (not shown) ordinarly will surround the source 19 to reflect the light emitted therefrom towards the rod.

The rod 11, the active medium, typically can be of ruby or other material useful for optical masers. Preferably, the cylindrical surface of the rod is smooth to entrap by total internal reflection the pumping light introduced by source S for longitudinal travel therein and its end surfaces planar and parallel to facilitate the role of the optical cavity formed by reflecting eements 13 and 14. Efficiency can be enhanced by cooling the rod.

The element 12 serves to collect pumping light incident on its surface and concentrate it for passage longitudinally through rod 11. Advantageously, the material of element 12 should have the same index of refraction as that of rod 11, which advantageously has a high index of refraction, but preferably should not appreciably absorb either the maser light or pumping light passing therethrough. For use with a ruby rod, sapphire or a glass with a matching index of refraction has the desired properties for the collecting element 12. Typically, the ratio of the areas of the two bases of element 12 should be in the range of between 6 and 9 to provide significant collecting action. Larger ratios are, of course, feasible.

The elements 13 and 14 in the preferred embodiment are planar and parallel although other shapes are feasible as known to workers in the art. Particularly effective in this regard is an optical cavity bounded by two spherical surfaces separated by their common radius of curvature. If only one element is spherical and the other planar, the radius of curvature of the spherical one should be twice the separation between the elements. Element 13 preferably reflects at least 99 percent of incident maser light while element 14 is designed to transmit at least several per cent for utilization purposes while reflecting the rest. Reflecting element 20 positioned at a 45 degree angle with respect to the axis of the rod is used to reflect the maser light transmitted through element 14 to utilization means. Alternately, a small hole may be made in reflecting element 16 to allow the extraction of the maser beam for use. Advantageously, element 13 should also reflect pumping light so as to further augment the entrapment of the pumping light.

Elements 16 and 17 advantageously are paraboloidal reflectors, element 17 being designed to collect the light emitted by source S and redirect it towards element 16 which in turn focuses it on the exposed end surface of the collecting element 12. Element 18 is a spherical mirror having its center of curvature at the center of the source S.

Light source S is chosen to provide light of appropriate wavelengths for creating an inverted population in element 11. In those instances where the only source used is source S, its intensity should be adequate to establish the conditions for oscillations. Alternatively, when source 19 also is employed, the intensity of source S should be less than enough to establish oscillations alone but the intensities of the two sources should be such that together they can establish oscillations. Typically, for use with ruby, the sources can be high pressure mercury arc lamps. In this way, by using pulsed modulating information to control source 19, pulse modulation of the maser light can be achieved. When source 19 is used for modulation, modulating element 15 becomes superfluous. In this case, element 14 can be a coating on a limited portion of the exposed end of collecting element 12.

The modulating element 15, if included, can take a variety of forms. It may be an element whose absorption of the maser light can be varied in accordance with modulating information to provide amplitude modulation or, alternatively, it may be an element whose optical length varies in accordance with modulating information to provide frequency modulation.

A Kerr cell is one example of a modulating element suitable for amplitude modulations.

A Christiansen filter having at least one component with a field-controllable refractive index may also be used. Such an element has a narrow pass band which may be varied to produce amplitude modulation.

A crystal of yttrium-iron garnet, or analogous material, whose index of refraction is a function of an applied magnetic field is an example of an element useful for frequency modulation. The basic principles of such an arrangement are described in application Serial No. 640,481, filed February 15, 1957 by J. F. Dillon. Alternatively, the modulating element may be a plasma, either in a solid such as a semiconductor or in a gas, whose index of refraction is related to the density of the ionized particles, or a material such as potassium dihydrogen phosphate whose index of refraction is a function of an applied electric field.

Modulation can also be achieved by modulating the mirror 14 either in orientation or position. For example, the modulating information can be applied as the electric field to a piezoelectric element mechanically coupled to the mirror. Instead of varying the orientation of the mirror 14, the angle at which the light rays are incident on its surface may be varied, for example, by means of a prism of material having a field-controllable index.

As another alternative, the mirror 14 can be coated with a film of ferrimagnetic material, such as yttrium-iron garnet, which exhibits a high degree of Faraday rotation and the modulating information used to modulate a magnetic field passing through the film. The inclusion of a polarizing element in the gap would result in modulation of the maser light.

Pulse modulation of the maser light can be achieved by applying other forms of triggering excitation than pulsed light from source 19. Alternative triggering techniques include irradiation with high energy particles, such as electrons, or X-rays.

There are a variety of pumping modifications possible. Either of light sources S or 19 can be composite sources, comprising an initial source of wide band energy used to irradiate an intermediate source which fluoresces at a narrow band better suited for pumping purposes. Alternatively, light source 19 can be a linear tube placed at one focus of an elliptical reflector with rod 11 at the other focus of the reflector.

Additionally, more complex optical arrangements can be utilized to improve the focusing of the light source S on the exposed end of the collecting element. A typical alternative arrangement utilizes a pair of spherical mirrors used off-axis such that any aberrations arising from the first mirror are compensated by the aberrations of the second mirror. Another arrangement uses one or more lenses to focus the source on the collecting element.

The separation of the reflecting mirror 14 from the exposed end of element 12 can be adjusted to reduce the number of modes at which the maser is oscillating. For example, the separation of the mirror and its size can be chosen so that only that mode corresponding to radiation which fills the mirror provides a sufficiently high Q to sustain oscillations.

Mode reduction can also be achieved if necessary by interposing discs or rings capable of absorbing the undesired modes in the interval separating the mirror 14 and the end of element 12.

Further possible modifications in the arrangement shown include the provision of a semitransparent coating on the exposed end of the element 12 designed to reflect a sizable fraction of the maser light, typically between 20 and 30 percent, to relax the requirements on mirror 14.

Filters can be placed between reflectors 16 and 17, positioned to absorb energy at the unwanted portions of the frequency spectrum provided by the pumping source, if such source provides energy at unwanted wavelengths. Such filtering prevents heating of the rod by such unwanted energy and minimizes de-excitation of the desired population inversion in rod 11 by spurious processes.

Additionally, reflecting element 13 can be displaced from the end of the rod if desired. In such a case, the modulating element may be inserted in the space so formed rather than between reflecting element 14 and the exposed end of collecting element 12.

To achieve more spatially homogeneous pumping action along the entire length of the rod, pumping light can be applied to each end. In this case, advantageously, each end should include a collecting element and the optical cavity for the maser light should enclose both collecting elements.

The high efficiency of end pumping as described also makes feasible solar pumping in which solar radiation serves as the primary source. In such a situation a paraboloidal element is used to provide an image of the sun, advantageously of area equal to or larger than that of the large base of the cone, on such base.

Accordingly, it is to be understood that the described embodiment is merely illustrative of the general principles of the invention and still other modifications are possible within the spirit and scope of the invention. For example, the output maser light can be abstracted at either end of the maser cavity by minor changes or the modulating element can be positioned outside the maser cavity.

What is claimed is:

1. In combination, an elongated rod of active maser material adapted to entrap by internal reflection light rays incident on an end surface thereof, means including a pair of reflecting elements aligned with opposite ends of said rod for forming an optical resonant cavity including the rod, means for pumping the rod to invert the population distribution between a pair of energy states therein comprising a light source and means for directing the light therefrom to incidence on an end surface of said rod, and means for abstracting from said resonant cavity coherent light wave energy of the frequency corresponding to the energy separation of said inverted states.

2. The combination of claim 1 in which the optical cavity includes a modulating element positioned intermediate one of the reflecting elements and one end of the rod.

3. The combination of claim 1 in which means for modulating the maser light are disposed between the said reflecting elements.

4. The combination of claim 1 in further combination with reflecting means forming an optical cavity for the pumping light, characterized in that the longitudinal axis of the pumping light cavity and the longitudinal axis of the coherent light resonant cavity are colinear, and in that said pumping light cavity includes said coherent light resonant cavity.

5. In combination,
an elongated rod of active maser material adapted to entrap by internal reflection light rays incident on an end surface thereof,
means forming an optical cavity resonator including said rod,
means for pumping said rod to perturb the population distribution between a pair of energy states therein to a point near the threshold for optical maser action comprising a first light source and means for directing the light therefrom to incidence on an end surface of said rod,
a second light source controllable independently of said first source for irradiating the sides of said rod, said first and second sources being effective to invert the population distribution between said energy states,
and means for abstracting from said resonator coherent light wave energy of the frequency corresponding to the energy separation of said inverted states.

References Cited

UNITED STATES PATENTS

| | | | |
|---|---|---|---|
| 2,569,127 | 9/1951 | Eltenton | 88—1 |
| 2,929,922 | 3/1960 | Schawlow et al. | 88—61 |

FOREIGN PATENTS

| | | |
|---|---|---|
| 608,453 | 9/1948 | Great Britain. |
| 454,628 | 2/1949 | Canada. |

OTHER REFERENCES

Electronics article, "Light Amplifier Extends Spectrum," Electronics, vol. 33, July 22, 1960, p. 43.

Hellwarth, "Control of Fluorescent Pulsations," Advances in Quantum Electronics, Columbia University Press, New York and London, 1961, pp. 334–341.

JEWELL H. PEDERSEN, *Primary Examiner.*

R. L. WIBERT, J. L. CHASKIN, *Assistant Examiners.*